United States Patent [19]
Greune et al.

[11] 3,774,395
[45] Nov. 27, 1973

[54] CONTROL SYSTEM FOR GAS TURBINE ENGINES

[75] Inventors: Christian Greune, Furstenfeldbruck; Karl Maier, Munich, both of Germany

[73] Assignee: Motoren-Und Turbinen-Union Munich GmbH, Munich, Germany

[22] Filed: Dec. 29, 1971

[21] Appl. No.: 213,772

[30] Foreign Application Priority Data
Dec. 29, 1970 Germany.................. P 20 64 340.7

[52] U.S. Cl. ....... 60/39.16 R, 60/39.25, 60/39.28 T
[51] Int. Cl. ............................................. F02c 3/10
[58] Field of Search ............... 60/39.28 T, 39.16 R, 60/39.25

[56] References Cited
UNITED STATES PATENTS

| | | | |
|---|---|---|---|
| 2,971,332 | 2/1961 | Lowrance...................... | 60/39.28 T |
| 3,662,545 | 5/1972 | Davis............................. | 60/39.28 T |
| 3,667,218 | 6/1972 | Davis............................. | 60/39.28 T |
| 3,691,405 | 9/1972 | Kendell......................... | 60/39.28 T |
| 3,017,749 | 1/1962 | Heppler......................... | 60/39.28 T |
| 3,128,946 | 4/1964 | Hoberman..................... | 60/39.28 T |
| 2,933,887 | 4/1960 | Davies........................... | 60/39.28 T |
| 3,114,240 | 12/1963 | Howard......................... | 60/39.28 T |
| 3,128,603 | 4/1964 | Haigh............................ | 60/39.28 T |
| 3,520,133 | 7/1970 | Loft ............................... | 60/39.28 R |
| 3,601,984 | 8/1971 | Davis ............................ | 60/39.28 R |

FOREIGN PATENTS OR APPLICATIONS

| | | | |
|---|---|---|---|
| 838,323 | 6/1960 | Great Britain ................ | 60/39.28 T |
| 1,027,821 | 4/1966 | Great Britain ................ | 60/39.28 T |

Primary Examiner—Clarence R. Gordon
Attorney—Paul M. Craig, Jr. et al.

[57] ABSTRACT

A control system for gas turbine engines wherein the gas temperature downstream of the combustion chamber is influenced by control of the quantity of fuel supplied to the combustion chamber and/or adjustment of the stator upstream of the power turbine. The gas temperature downstream of the combustion chamber is measured by a measuring device having an inherent time delay which is incorporated in the output signal of the device which is indicative of the measured temperature. The output signal is fed to a correction device which compensates for the inherent time delay and the compensated signal is compared with a signal representative of a desired temperature value in accordance with the engine parameters. An output signal of the difference between the measured temperature and the desired temperature is fed to a control device for adjusting the quantity of fuel supplied to the combustion chamber and/or adjusting the stator upstream of the power turbine. The response of the measuring device can be represented by first and second time constants and the correction device includes a feedback network having an impedance corresponding to the time constants for compensating the output signal of the measuring device.

13 Claims, 4 Drawing Figures

Patented Nov. 27, 1973  3,774,395

CONTROL SYSTEM FOR GAS TURBINE ENGINES

The present invention relates to control systems for gas turbine engines provided with a temperature regulating system which controls the fuel flow or other engine variables such as the stator upstream of a power turbine.

In control systems for gas turbine engines wherein thermocouples are employed for measuring a gas temperature, an indicating error occurs due to the time lag inherent in these thermocouples. As a result, the temperature control for the engine may be incorrectly utilized or even be entirely ineffective for the desired purpose.

It is therefore an object of the present invention to provide a control system for gas turbine engines which overcomes the drawbacks of prior systems.

It is another object to provide a control system for gas turbine engines having improved and simplified temperature regulation.

It is a further object of the present invention to provide a control system for gas turbine engines utilizing at least one thermocouple for measuring the temperature and incorporating a correction network to compensate for the inherent time lag of the thermocouple.

In accordance with the present invention there is provided a control system for a gas turbine engine having a measuring device incorporating at least one thermocouple arranged downstream of the combustion chamber of the engine for measuring the gas temperature and providing an output voltage indicative thereof to an amplifier and then to a correction network which compensates the amplifier output voltage. The output voltage signal is applied to a temperature regulator together with a nominal output voltage of a desired value from a transmitter wherein the output of the transmitter is dependent upon the engine parameters. The temperature regulator compares the two signals and provides an output signal indicative of the difference in the applied signals which is amplified in a control amplifier and fed to an actuator of a fuel control device which controls the fuel control for metering the flow of fuel to the combustion and/or for varying the stator blades upstream of the power turbine via suitable intermediate members in accordance with the amplified signal.

According to a feature of the present invention, the correction network includes an amplifier for comparing amplified output voltage of the temperature measuring device and a feedback voltage controlled by two time dependent portions of a feedback network of the amplifier which two portions are representative of the two time constants of a thermocouple.

According to another feature of the present invention, the two time dependent portions of the feedback network are formed by variable resistors and capacitors such that the time constants of the network can be easily adjusted in accordance with the type of thermocouples utilized in the temperature measuring device. Additionally, the resistors forming the time constants may be formed with a manually variable portion and an automatically variable portion which is varied in accordance with the engine parameters such as speed.

These and further objects, features and advantages of the present invention will become more obvious from the following description when taken in connection with the accompanying drawings which show, for purposes of illustration only, one embodiment in accordance with the present invention, and wherein.

Figure 1:
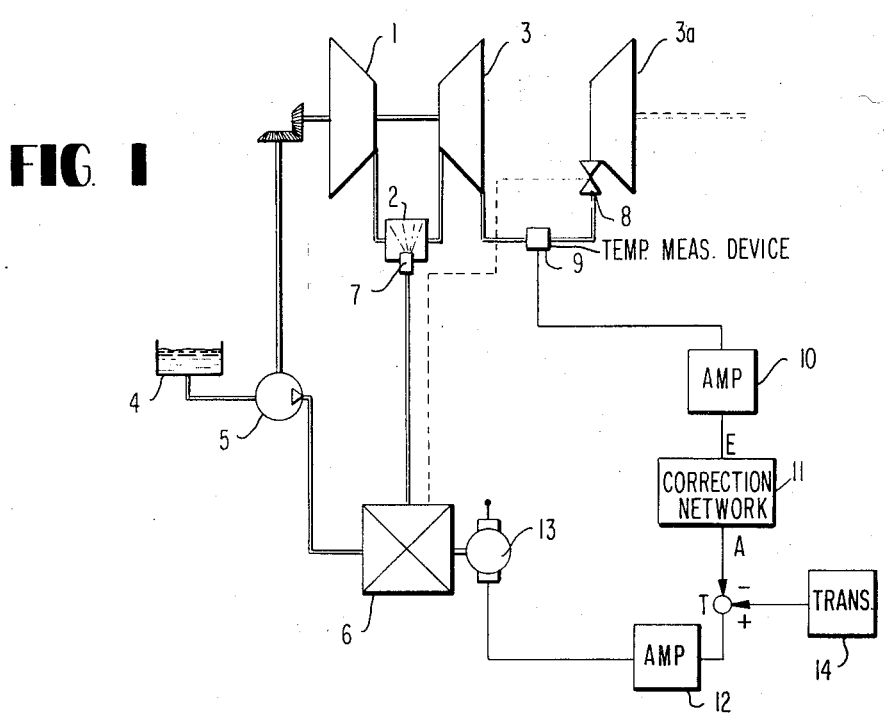
FIG. 1 is a schematic view of a gas turbine engine in accordance with the present invention.

Referring now to the drawings, FIG. 1 shows a schematic arrangement of a gas turbine engine equipped with a control system according to the invention. Air is drawn in via one or several compressors 1 and routed to combustion chamber 2 having fuel injected therein for increasing the air temperature. The hot gas expands in one or several turbines 3 arranged downstream of the combustion chamber, and a portion of the energy of the gas is utilized by the turbine wheels for driving the compressor and for producing the output power.

Fuel from a tank 4 is fed to the combustion chamber via a pump 5 which may be driven by the engine and which delivers the fuel under increased pressure to a fuel control 6. The fuel control meters the fuel to an injection nozzle 7 arranged in the combustion chamber as a function of various parameters, e.g., as a function of the position of an actuator 13. The fuel control 6, moreover, influences other engine assemblies, e.g., a variable stator 8 located upstream of a power turbine $3a$, for effecting the gas temperatures downstream of the combustion chamber. Temperature measuring devices 9 which, for example, may include a plurality of spaced thermocouples are provided downstream of the combustion chamber for measuring the gas temperatures at different points. Depending upon whether one or more thermocouples are utilized, the device 9 provides an output voltage corresponding to the mean gas temperature downstream of the combustion chamber and this voltage is fed to an amplifier 10. The amplifier 10 increases the thermocouple voltage of a few millivolts to several volts and acts as a constant linear amplifier having an amplification factor which is independent of frequency in a range from 0 to approximately 100 cps. The output of the amplifier 10 designated by the reference letter E is fed to a correction network 11 which serves for compensating the voltage signals of the amplifier 10 in such a manner that the time lags inherent in the thermocouples are substantially compensated. The output signal A of the correction network is fed to a temperature regulator T in the form of a comparator wherein it is compared with a desired nominal voltage representative of a desired temperature and which is generated by a transmitter 14 as a function of engine parameters. The difference in voltages as produced by the temperature regulator is amplified in a control amplifier 12 and fed to an actuator 13 which serves for controlling the fuel control 6 in accordance with the output signal of amplifier 12. The engine parameters influencing the downstream gas temperature, such as the fuel quantity injected through nozzle 7 or the guide vanes of stator 8 upstream of power turbine $3a$ are then adjusted via suitable intermediate connecting members responsive to the fuel control 6. As shown in FIG. 1, the intermediate members leading to the stator are shown in broken line.

Figure 2:
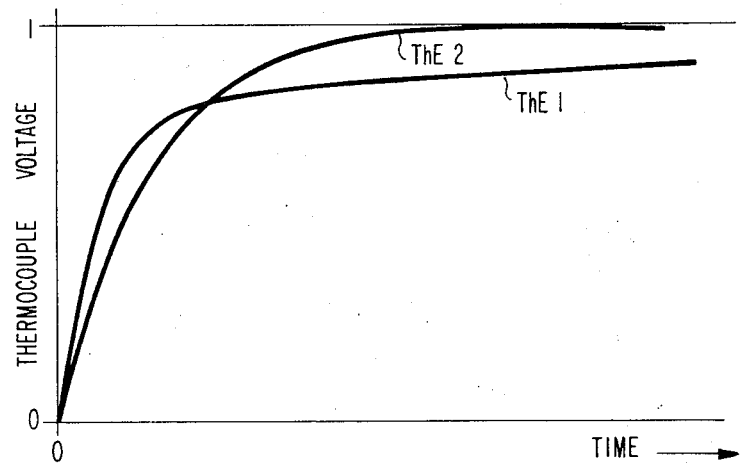
FIG. 2 illustrates curves of the step response functions of different thermocouples.
Figure 3:
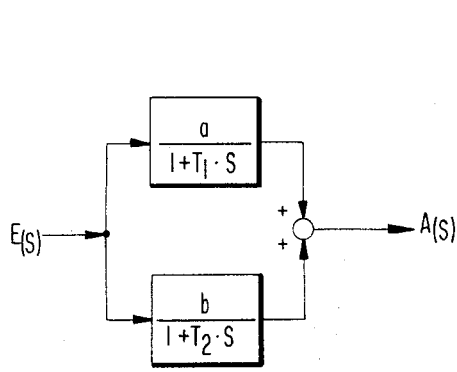
FIG. 3 is a block diagram of a correction network.

In FIG. 2, the step response functions of differently constructed thermocouples $ThE_1$ and $ThE_2$ are shown. Each curve representing the step response of a different thermocouple has both a steep portion and a flat portion which can be approximated by first and second time constants, respectively, for each thermocouple. An analysis of these step response functions shows that their dynamic behavior is adequately represented by the block diagram in FIG. 3. As is shown in this figure, two additive members are combined to form the common step response functions which are expressed by the following equations:

Time function:

$$A_{(t)} = 1 - a \cdot e^{-t/T} - b \cdot e^{-t/T} \quad (1)$$

Transformed function:

$$A_{(s)} = 1/s \; (a/1+T_1 \cdot s + b/1+T_2 \cdot s) \quad (2)$$

or:

$$A_{(s)} = 1 + \alpha \cdot s/s \; (1+T_1 \cdot s)(1+T_2 \cdot s) \quad (3)$$

Where $$\alpha = a \cdot T_2 + b \cdot T_1; \; a + b = 1; \quad (4)$$

with $t \leq 0 \; E_{(t)} = 0$ with $t \geq 0 \; E_{(t)} = 1$ and $A_{(t)}$ is the output as a function of time
$a, b$ are adjustable feedback voltages
$t$ is time
$T_1, T_2$ are the time constants ($T_1 = R_1 \cdot C_1; T_2 = R_2 \cdot C_2$)
$A_{(s)}$ is the output as transformed function
$s$ is the Laplacian operator
$\alpha$ is a factor
$E_{(t)}$ is the step input
$F_{(s)}$ is the transfer function Accordingly, when utilizing the inverse time behavior of the thermocouples for correction purposes, the dynamic error due to the time lag of the thermocouples can be compensated to such a degree that the temperature control circuit can also use rapidly changing signals for achieving the desired control.

Figure 4:
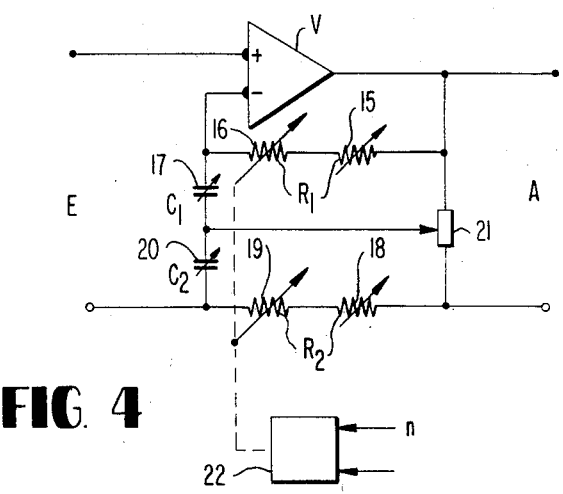
FIG. 4 is a circuit diagram of the correction network.

Referring now to FIG. 4, there is shown the circuit diagram for the correction network of the present invention and having the transfer function:

$$F_{(s)} = (1 + T_1 \cdot s)(1 + T_2 \cdot s) / 1 + \alpha \cdot s \quad (5)$$

An output voltage signal E from the amplifier 10 is compared with a feedback voltage at the input of amplifier V. This feedback voltage is provided by time-dependent members $R_1$ 15, 16 and $C_1$ 17 and $R_2$ 18, 19 and $C_2$ 20, representing the time constants $T_1$ and $T_2$ for a thermocouple. A potentiometer 21 serves for controlling the values of the feedback voltages a and b in the above equations (2) and (4) whereby adjustment of the potentiometer serves for varying the influence of the individual time constants of the correction network. The output signal A of the correction network is fed to the temperature regulator T for control purposes. Thus, it is possible to effectively account and compensate for the physical properties of the thermocouples utilized and to provide an effective temperature control circuit for gas turbine engines. Moreover, with this arrangement, thermocouples can be used where the second time constant is dominant since it can be exactly compensated. Thus, thermocouples of different configuration can be used. In addition, this arrangement can be made compatible with various thermocouple designs by adjustment of the different circuit parameters.

In order to further increase the efficiency of the correction network, the resistors $R_1$ and $R_2$ are formed as adjustable resistors. In addition, as shown in FIG. 4, the resistors $R_1$ and $R_2$ can be formed of two resistive components wherein each resistor has a portion 15 and 18, respectively, which can be used for manual setting purposes and another portion which is automatically adjusted via member 22 as a function of engine parameters such as speed n. In this manner, the time constants of a thermocouple which vary not only in accordance with the structural configuration of a thermocouple, but also in accordance with the different operating conditions of the gas turbine engine gay be exactly corrected. The different operating conditions such as engine speed and velocity and density of the gas which flows past the thermocouples of the temperature measuring device may be fed to the member 22 for effecting automatic adjustment of the portions 16 and 19 of the resistors $R_1$ and $R_2$.

Obviously, many modifications and variations of the present invention are possible in the light of the above teachings. It should therefore be understood that within the scope of the appended claims, the invention may be practiced otherwise than as specifically described.

We claim:

1. A control system for gas turbine engines of the type having a compressor, a combustion chamber and at least one power turbine in which the gas temperature downstream of the combustion chamber is influenced in accordance with at least one of the quantity of fuel supplied to the combustion chamber and the variation of the stator upstream of the power turbine, the control system comprising measuring means arranged in the gas flow path of the engine downstream of the combustion chamber for measuring the gas temperature and for providing an output voltage signal indicative thereof, said measuring means having an inherent time delay corresponding to a combination of first and second time constants incorporated in the output signal thereof, said measuring means including amplifying means for providing an amplified output signal, correction means responsive to the output signal of said measuring means for compensating for the time delay of said measuring means and providing a compensated output signal, said correction means including comparison means for comparing the amplified output voltage signal of said measuring means with a feedback voltage of said comparison means, the feedback voltage being formed by feedback means including first and second impedance means corresponding to the first and second time constants and connected between the output and an input of said comparison means, transmitter means for providing an output signal indicative of a desired temperature value in dependence upon the engine parameters, temperature regulator means responsive to the corrected output signal and the output signal of said transmitter means for providing a difference output signal, and actuator means responsive to the difference output signal for controlling at least one of the quantity of fuel supplied to the combustion chamber and the adjustment of the stator upstream of the power turbine for effecting control of the gas temperature downstream of the combustion chamber.

2. A control system as defined in claim 1, wherein said temperature regulating means includes amplifying means for providing an amplified output signal.

3. A control system as defined in claim 1, wherein said measuring means includes at least one thermocouple providing an output voltage signal indicative of the temperature measured.

4. A control system as defined in claim 1, wherein said measuring means includes a plurality of thermocouples arranged at spaced positions within the gas flow downstream of the combustion chamber, said thermocouples arranged to provide as the output of said measuring means a voltage signal corresponding to the mean temperature value measured by said thermocouples.

5. A control system as defined in claim 1, wherein said first and second impedance means each include a resistor and capacitor.

6. A control system as defined in claim 1, wherein said feedback means includes a potentiometer for controlling the effect of said first and second impedance means on said feedback voltage applied to an input terminal of said comparison means.

7. A control system as defined in claim 5, wherein each of said resistors and capacitors is variable for providing a desired time constant for said first and second impedance means.

8. A control system as defined in claim 7, wherein each of said resistors of said first and second impedance means includes a first resistive portion which is manually adjustable and a second resistive portion which is automatically adjustable, and means responsive to at least one operating engine parameter for automatically adjusting said second resistive portion.

9. A control system as defined in claim 8, wherein said means responsive to at least one engine parameter is responsive to speed.

10. A control system for gas turbine engines of the type having a compressor, a combustion chamber and at least one power turbine in which the gas temperature downstream of the combustion chamber is influenced in accordance with at least one of the quantity of fuel supplied to the combustion chamber and the variation of the stator upstream of the power turbine, the control system comprising measuring means arranged in the gas flow path of the engine downstream of the combustion chamber for measuring the gas temperature and for providing an output voltage signal indicative thereof, said measuring means having an inherent time delay incorporated in the output signal thereof, correction means responsive to the output signal of said measuring means for compensating for the time delay of said measuring means and providing a compensated output signal, transmitter means for providing an output signal indicative of a desired temperature value in dependence upon the engine parameters, temperature regulator means responsive to the corrected output signal and the output signal of said transmitter means for providing a difference output signal, and actuator means responsive to the difference output signal for controlling at least one of the quantity of fuel supplied to the combustion chamber and the adjustment of the stator upstream of the power turbine for effecting control of the gas temperature downstream of the combustion chamber, said correction means including first and second input terminals and first and second output terminals, an operational amplifier having first and second input terminals and an output terminal, said first input terminal and said output terminal of said amplifier being connected to said first input terminal and said first output terminal of said correction means, and feedback means connected between said output terminal and said second input terminal of said amplifier, said feedback means including a first resistor having a first terminal connected to said amplifier output terminal and a second terminal connected to said second amplifier input terminal, a first capacitor having a first and second terminal, said first capacitor terminal being connected to the second terminal of said first resistor, a potentiometer having a first terminal connected to said first terminal of said first resistor and a second terminal connected to said second output terminal of said correction means, said potentiometer having a wiper arm connected between said potentiometer and said second terminal of said first capacitor, a second resistor having a first terminal connected to said second terminal of said potentiometer, and a second terminal connected to said second input terminal of said correction means, and a second capacitor having a first terminal connected to said second terminal of said second resistor and a second terminal connected to said wiper of said potentiometer.

11. A control system as defined in claim 10, wherein said first and second resistors each include a first resistive portion which is manually adjustable and a second resistive portion which is automatically adjustable, and means responsive to at least one operating engine parameter for automatically adjusting said second resistive portion.

12. A control system as defined in claim 1, wherein said comparison means includes an operational amplifier having said first and second impedance means corresponding to the first and second time constants connected in the feedback path thereof.

13. A control system as defined in claim 1, wherein said correction means has a transfer function $$F_{(s)} = (1 + T_1 \cdot s)(1 + T_2 \cdot s)/1 + \alpha \cdot s$$

where
$F_{(s)}$ is the transfer function;
$T_1$ is the first time constant;
$T_2$ is the second time constant;
$\alpha$ is a factor; and
$s$ is the Laplacian operator.

* * * * *